Oct. 22, 1935.  C. A. LAISE  2,018,073
ELECTRODE OR CONTACT MECHANISM
Filed March 25, 1933
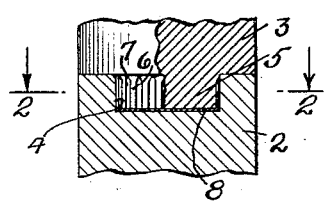
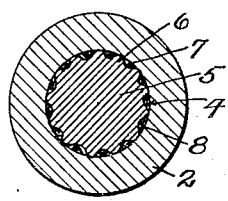
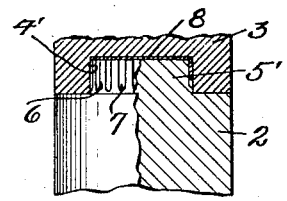
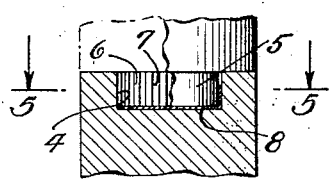
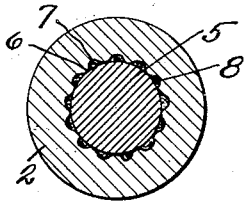
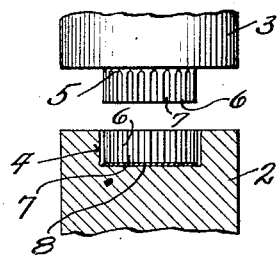
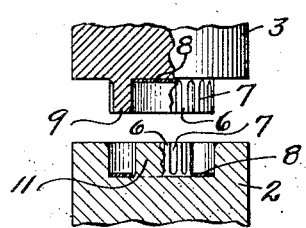
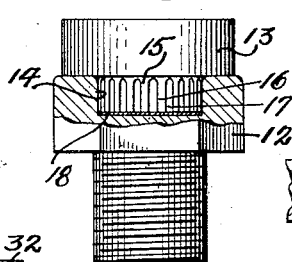
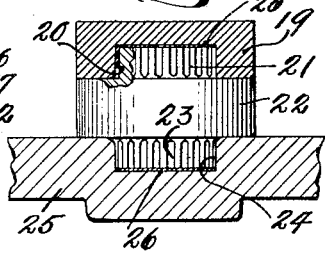
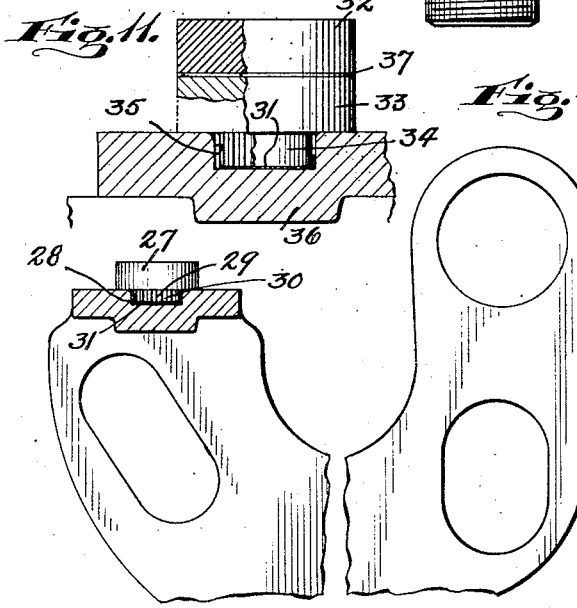
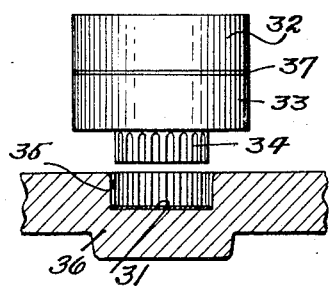
INVENTOR.
Clemens A. Laise.
BY
Kiddle, Margeson and Hornidge
ATTORNEYS.

Patented Oct. 22, 1935

2,018,073

UNITED STATES PATENT OFFICE 2,018,073

ELECTRODE OR CONTACT MECHANISM

Clemens A. Laise, Tenafly, N. J., assignor to Eisler Electric Corporation, Union City, N. J., a corporation of Delaware Application March 25, 1933, Serial No. 662,701

3 Claims. (Cl. 200—166)

My invention relates to electrode or contact mechanism and is well adapted for use in connection with the brazing or welding of precious metals and alloys and refractory metals and alloys to a base metal.

One of the objects of my invention is the provision of a method whereby articles such as contacts of precious metals and refractory metals and their alloys may be welded or brazed to a support of a base metal much more economically and much more accurately than possible by processes now known to the art.

In the processes now in use, in the art of making electric contacts, for example, accurate positioning of the contact face plate of refractory metal such as tungsten, for instance, on the base metal backing, whether screw or rivet or breaker arm is exceedingly difficult and a large percentage of off-center contacts and out-of-position breaker arms result. Furthermore, in such processes only the end of the contact is welded or brazed to its support.

It has been suggested to form depressions in the breaker arm or mount for the contact and after the introduction of solder into this depression the contact point is placed in the depression and the assembly subjected to heat. It has been found, however, that on melting the solder the contact is forced out of position with respect to the depression or cup and globules of the solder ooze out over one side of the cup to produce a poor weld.

Essentially my invention provides a process for joining two metals, a precious metal or alloy or a refractory metal or alloy and a base metal, for example, by providing at the juncture or joint a male and female structure capable of being fitted into each other, the inner surface of the female member or the outer surface of the male member, or both, being provided with ridges and depressions as by fluting or knurling. The male member is forced into the female member by the use of pressure, as with an arbor press, for example, upon the brazing material resting in the bottom of the female member. The brazing material is then melted in any suitable fashion whereupon part of the brazing or welding material is drawn by surface tension up through the channels or capillary passages provided by the fluting or knurling to produce a weld not only at the bottom of the male and female members but along the sides as well so that accurate positioning of the one with respect to the other and a good strong weld are assured.

When making contact structure, for instance, by my improved process the exact position of the contact on its base metal carrier is determined by drilling or punching a depression or cup in the carrier. I then produce a face plate or rivet of the contact metal the shank of this face plate or rivet to be of the same diameter as the inside diameter of the cup or depression. The sides of the shank of the face plate or rivet or the side walls of the depression, or both, are then provided with ridges and depressions as by fluting or knurling so that the outside diameter of the shank at the ridges is slightly larger than the diameter of the cup or depression.

I then introduce a brazing or welding disc into the depression and force the face plate or rivet into the cup with an arbor press or other suitable device to provide a press fit. The assembly may then be passed through a suitable welding furnace and brought to welding heat, the brazing or welding material seeping into the depressions between the two members so as not only to weld the bottom of the contact to the bottom of the cup but to weld the sides of the contact to the side walls of the cup as well.

The process briefly outlined above enables me to produce contacts in large quantities much more economically than by prior processes, by reason of the fact that the contact is inserted in a cup-like depression in its carrier with a press fit so that no particular care need be exercised in handling the assembly either before or during the welding operation. I am assured also that the contacts always will be accurately positioned on their carriers because of the fact that either the carrier or contact is fluted, or both may be fluted as above mentioned, and are assembled under pressure. The contact can not be forced out of position by the welding material during the welding operation.

My process also insures a very strong and perfect weld by reason of welding at the side as well as at the bottom so that for make-and-break contacts, for instance, where the contact is subjected to a great deal of abuse I am always assured that the contact will not work loose in its carrier.

In the drawing:

Fig. 1 is a sectional fragmentary view illustrating diagrammatically one embodiment of my invention;

Fig. 2 is a section on the line 2—2 of Fig. 1;

Fig. 3 illustrates diagrammatically another embodiment of my invention;

Fig. 4 is a view illustrating still another embodiment of my invention;

Fig. 5 is a section on the line 5—5 of Fig. 4;

Figs. 6 and 7 illustrate two other embodiments of my invention;

Fig. 8 illustrates a contact made in accordance with my process; and

Figs. 9, 10, 11 and 12 are views illustrating various other forms of contact mechanisms made in accordance with my invention.

Referring first of all to Figs. 1 and 2, 2 designates a piece of metal which is to be welded or brazed to another piece of metal 3.

According to the procedure illustrated in Figs. 1 and 2, the member 2 is provided with a cup-shaped depression 4 which may be round in cross section, as illustrated, or of any other suitable shape.

The shank 5 of the member 3 is approximately the same diameter as the diameter of the cup 4, and in the illustration under discussion the sides of this shank are provided with ridges 6 and depressions 7 by fluting, knurling or in any other way that may be found desirable, the idea being to provide ridges and depressions in the face of the shank 5 for a purpose to be hereinafter brought out. By the same token the ridges 6 and depressions 7 may take shapes other than those shown and the number of ridges and depressions may of course be varied.

In ridging the shank 5 the metal of the shank is forced outwardly slightly so that the shank across the ridges is now slightly larger than the cup 4.

The two members are next assembled under pressure, in an arbor press, for example, or by the use of other suitable apparatus a disc of welding material 8 first being placed in the bottom of the depression 4. This assembly is then placed in a welding boat or pan and passed into a suitable furnace where it is subjected to a temperature sufficiently high to melt the brazing material. In this operation the molten brazing material 8 in part is drawn by surface tension upwardly through the capillary tubes artificially produced by the ridges and depressions on the shank 5, as illustrated in Fig. 2, to produce a weld not only at the bottom of the depression but along the sides of the two members as well.

No particular precaution has to be taken in handling the assembly or in placing the assembly in the welding tray since the male member is a press fit in the female member and the capillary tubes provided along the sides of the male member prevent the brazing or welding material from running out.

Referring now to Fig. 3 it will be seen that in this instance the member 2 has been provided with a fluted shank 5' and the member 3 with a cup-shaped depression 4' to receive this shank with a press fit. In all other respects the two embodiments are the same and further description, therefore, is believed unnecessary.

In Figs. 4 and 5 the member 2 is provided with a cup-shaped depression 4 as in Fig. 1, and the member 3 with a shank 5 received by this cup-shaped depression with a press fit, but in this instance the side walls of the cup-shaped depression are fluted instead of the shank 5. In all other respects the showings of Figs. 1 and 4 are the same.

In Fig. 6 I show an embodiment of my invention in which the member 3 is provided with a shank 5 and member 2 with a cup-like depression 4, as in the case of Fig. 1 for example. In this case, however, both the shank 5 and the side walls of the cup-like depression 4 are provided with ridges 6 and depressions 7. In all other respects this embodiment of my invention is the same as illustrated and described in connection with Fig. 1 so that further description is believed unnecessary.

In Fig. 7 which illustrates a still further modification of my invention, the member 3 is provided with a hollow shank 9 fluted exteriorly to provide ridges 6 and depressions 7. The member 2 is provided with a groove or annulus 10 of the same shape as the hollow shank 9. This annular groove provides a stud 11 in the face of the member 2, which it will be understood is received by the hollow shank 9. The stud 11 may be fluted as shown, if desired, and for that matter the interior of the hollow shank as well. In assembling the same procedure is followed as in the other forms of my invention already described.

At this point in my description I wish to emphasize that the male and female members need not be made round in cross section as illustrated, but square, hexagonal or any other suitable shape; that the male member or the female member, or both, may be provided with ridges and depressions; and that the number, size, arrangement and shape may be varied from the forms shown and described, these merely illustrating the principles of my invention.

As so far described in detail my invention is directed to the brazing or welding of two pieces of metal for any purpose.

Referring now specifically to the showing of Fig. 8. In this figure 12 designates a threaded stud or carrier for a contact 13 of tungsten for instance or other refractory metal or a contact of precious metal, for instance.

This stud 12 is provided with a cup-like depression or hollow 14 which may be precisely and accurately located by drilling or punching. The contact 13 which, as above noted, may be tungsten, molybdenum, platinum, iridium or other suitable material has a shank 15 which is provided with ridges 16 and depressions 17 as by fluting, knurling or other suitable means. In the finished contact the shank 15 is slightly larger than the depression 14. A disc or wafer of brazing material 18 is then placed in the bottom of the cup or depression 14 and the contact stud introduced into the cup under pressure.

In employing a contact composed entirely of tungsten or other refractory material as illustrated in Fig. 8, I prefer to use copper for the brazing material 18 since its electrical conductivity is high.

The assemblies are then placed in welding boats or trays of nickel or nichrome or any other suitable material which will not contaminate the contact and placed in a suitable furnace to be subjected to a welding temperature, i. e., a temperature slightly higher than the melting point of the brazing material but not above its vaporization point. This operation is preferably carried out in a hydrogen atmosphere.

The length of time of heating should be just sufficient to bring the stud 12 up to the melting point of the brazing material 18 and held only sufficiently long to permit the molten brazing material to seep up the capillary tubes provided by the fluting of the shank of the contact, after which they are shoved into a cooling chamber.

In making up the contact point or stud 13, when employing tungsten, for example, I subject the wrought tungsten to special treatment, namely I employ a heading or punching operation whereby I head rivets or studs of the tungsten at red heat in suitable moulds or dies to form and flute the shank although the fluting of the shank may be done subsequently, if desired. In any event, a denser and more compact contact is provided than used heretofore, and this in conjunction with the superior weld I produce as above described provides for better electrical and heat conduction and enables me to operate my contacts at a lower temperature and with less heating under the same current conditions than possible with prior structures; and as a consequence of all this my contacts have less tendency to pit, less tendency to loosen in their carriers and will withstand rougher usage without deterioration or failure than prior contacts.

It is to be understood that if materials other than tungsten are to be employed for the contact points, such as platinum, iridium and other contact metals, these too may be subjected to the heading or punching operation above referred to whereby I add to the compactness of the metal and prolong the life of the contact.

On contacts with large face plates the preparation of headed rivets or contact points composed entirely of refractory metal is not desirable for purposes of economy; and I have illustrated in Fig. 9 a form of construction suitable for employment in such circumstances.

Referring to this figure of the drawing, it will be seen that 19 designates a face plate of contact metal such as tungsten for instance made up in a manner similar to that described in connection with the contact of Fig. 8 to compress the metal, this member being provided with a cup-like depression 20. This depression receives with a press fit one fluted shank 21 of a base metal stud 22. This stud is provided with another fluted shank 23 which is introduced with a press fit into a cup-like depression 24 in contact carrying arm 25. Brazing wafers 26 are placed in each of the depressions 20 and 24 so that when the assembly is subjected to welding heat the brazing material, as before, will seep along the sides of the shanks 21 and 23 to weld the assembly along the sides as well as along the ends of the shanks.

In Fig. 10 I show a construction similar to that in Fig. 8, except that the fluted contact 27 is pressed into a cup-like depression 28 in an arm 29 instead of into a threaded stud as in Fig. 8. The ridges and depressions in the contact 27 are designated 29 and 30, respectively, and the welding material 31.

In Fig. 11 the contact or face plate, of tungsten for instance, 32 is welded to a base metal stud 33 by a procedure well known in this art. The stud 33 is provided with a shank 34 having a press fit in a fluted cup-like depression 35 in carrier arm 36 with a brazing wafer in the bottom of the cup. In making up this structure it is to be understood that the material shown at 37 for welding or brazing the contact face plate 32 to the stud 33 must have a higher melting point than the material used for brazing or welding the stud to the arm to avoid fusing of the material 37 during the welding or brazing of the stud to the arm.

In Fig. 12 I have shown a construction similar to Fig. 11 except in this case both the shank 34 and the walls of the depression 36 are fluted.

It is to be understood the details above described may be varied within the purview and scope of my invention.

What I claim is:—

1. Electrode or contact mechanism comprising in combination a refractory metal rivet and a base metal support therefor, one of said members being provided with a shank, the other with a depression, said shank and depression interfitting with a press fit, the sides of one of said members being provided with depressions so arranged as to afford capillary passages between the two members, and a fusible material confined to and filling said capillary passages and the area between the end of the shank and the bottom of the depression, thereby to weld or braze the two members to each other.

2. A contact assembly comprising in combination a metal rivet faced with a refractory metal and a base metal support therefor, one of said members being provided with a shank, the other with a depression, said shank and depression interfitting with a press fit, the sides of one of said members being provided with depressions so arranged as to afford capillary passages between the two members, and a fusible material confined to and filling said capillary passages and the area between the end of the shank and the bottom of the depression, thereby to weld or braze the two members to each other.

3. A contact assembly comprising in combination a contact having a depression in one face thereof, a rivet having a shank fitting into said depression with a press fit, said shank being provided with depressions so arranged as to provide capillary passages, fusible material confined to the area between the bottom of said depression and the adjacent end of the rivet shank and to said capillary passages to weld the rivet and contact to each other, said rivet having another shank also provided with depressions affording capillary passages, a support for the contact-rivet assembly, said support being provided with a depression receiving the last mentioned rivet shank with a press fit, and fusible material confined to the capillary passages of the last mentioned shank and to the area between the bottom of the last mentioned depression and the adjacent end of the last mentioned rivet shank to weld the contact-rivet assembly to its support.

CLEMENS A. LAISE.